United States Patent [19]
Motegi et al.

[11] 4,171,416
[45] Oct. 16, 1979

[54] α-CYANOACRYLATE-TYPE ADHESIVE COMPOSITION

[75] Inventors: Akira Motegi; Eiji Isowa; Kaoru Kimura, all of Nagoya, Japan

[73] Assignee: Toagosei Chemical Industry Co., Ltd., Tokyo, Japan

[21] Appl. No.: 897,882

[22] Filed: Apr. 19, 1978

[30] Foreign Application Priority Data

Apr. 19, 1977 [JP] Japan .................................. 52-44129

[51] Int. Cl.$^2$ ....................... C08F 4/00; C08F 118/14; C08F 118/16
[52] U.S. Cl. ...................................... 526/245; 424/61; 424/77; 428/463; 428/492; 428/514; 428/520; 428/522; 526/193; 526/196; 526/198; 526/204; 526/205; 526/285; 526/292; 526/298
[58] Field of Search ............... 526/204, 298, 193, 196, 526/198, 205, 245, 285, 292; 424/61, 77; 260/881

[56] References Cited

U.S. PATENT DOCUMENTS

| | | | |
|---|---|---|---|
| 3,527,841 | 9/1970 | Wicker et al. | 526/298 |
| 3,701,758 | 10/1972 | Maska | 526/298 |
| 3,759,264 | 9/1973 | Coover et al. | 526/298 |
| 3,890,278 | 6/1975 | Lehn et al. | 526/204 |

*Primary Examiner*—Harry Wong, Jr.
*Attorney, Agent, or Firm*—Sughrue, Rothwell, Mion, Zinn and Macpeak

[57] ABSTRACT

A fast-setting α-cyanoacrylate-type adhesive composition having good storage stability comprising an α-cyanoacrylate and about 0.1 ppm or more of at least one macrocyclic polyether compound or an analogue thereof, such as 18-crown-6 or 15-crown-5.

11 Claims, No Drawings

α-CYANOACRYLATE-TYPE ADHESIVE COMPOSITION

BACKGROUND OF THE INVENTION

1. Field of the Invention

This invention relates to an α-cyanoacrylate-type adhesive composition, and more particularly to an adhesive composition having a fast setting time.

2. Description of the Prior Art

α-Cyanoacrylate-type adhesives, because of the inherent anion-polymerizability of the α-cyanoacrylate monomer as a main component, begin to polymerize in the presence of a weak anion such as in the presence of slight moisture adhering to the surface of the adherend, and can firmly bond almost all materials except certain inert materials such as polyethylene and tetrafluoroethylene resins (e.g., Teflon) within several seconds to several minutes. Hence, they have found extensive use as instantaneous adhesives in industry, in medical uses, in hobby applications, and in the home.

The curing of α-cyanoacrylate-type adhesives is due to the anionic polymerization of the α-cyanoacrylate monomer. When such an adhesive is used to bond materials whose bonding surfaces are acidic, such as wood or surfaces which tend to permit the formation of an acidic oxide coating, the anionic polymerization of the α-cyanoacrylate is inhibited, and the setting time of the adhesive is slow. Thus, the adhesion strength is sometimes not entirely satisfactory. For example, wooden materials in general use have a moisture content of about 10% by weight under normal conditions (i.e., at 23° C. and a relative humidity of 55%). In spite of this high water content in the woody tissue and on the surface of the wooden materials, a setting time of from several minutes to between ten and twenty minutes is required to bond these wooden materials with conventional α-cyanoacrylate-type adhesives. Since α-cyanoacrylate-type adhesives penetrate into the woody tissue during this period, it is generally considered difficult to bond wooden materials with these adhesives. Usually, wooden materials are acidic because of the presence of sap, etc. in the wood. If the surface of the material is acidic, naturally the anionic polymerization of the α-cyanoacrylate monomer would be hindered, and the speed of curing decreased. Consequently, the effect of the adhesives as instantaneous adhesives decreases drastically.

A chromate-treated surface of a metal is usually acidic, and a surface obtained by neutralizing the acidic surface using a Unichrome treatment has lower weatherability than the chromate-treated surface. Accordingly, where parts with weatherability are required, such preferably have an acidic chromate-treated surface. In bonding such a surface, α-cyanoacrylate-type adhesives have a slow setting time, and the adhesion strength of the bond is low.

α-Cyanoacrylate-type adhesives are chemically reactive adhesives which cure by anionic polymerization. These adhesives usually have a low viscosity, and therefore, when they are applied to the adherend, an initial tackiness, as in the case of rubber-type adhesives, is not obtained with α-cyanoacrylate-type adhesives. The adherend must be fixed for several minutes until anionic polymerization begins.

Furthermore, in a bonding operation on an assembly line, the adherend must be fixed for a certain period of time by a jig, etc., and therefore, the efficiency of operation decreases. Since α-cyanoacrylate adhesives are "instantaneous" adhesives, it is necessary for them to cure on many materials with as fast a setting time as possible. The rapidity of the setting time will broaden the range of application of α-cyanoacrylate-type adhesives.

Many methods for increasing the setting time of α-cyanoacrylate-type adhesives have been investigated heretofore. These methods include, for example, a method which involves increasing the purity of the α-cyanoacrylate monomer, and a method which involves decreasing the amount of anionic polymerization inhibitor to be added.

Generally, the activity of anionic polymerization tends to be markedly affected by very small amounts of impurities, and in anionic polymerization of an α-cyanoacrylate monomer, an attempt has been made to minimize the amounts of impurities such as the presence therein of starting materials, catalyst and polymers of low degrees of polymerization in order to increase the setting time of the resulting product. However, because an α-cyanoacrylate monomer has unique anionic polymerizability, difficulties, such as the provision of a feasible apparatus, are encountered in obtaining an α-cyanoacrylate monomer of a high purity. Accordingly, this method of increasing the purity of the monomer is difficult to perform on a commercial scale.

Usually, an anion polymerization inhibitor (stabilizer) such as sulfur dioxide, propane sultone or p-toluenesulfonic acid is incorporated in α-cyanoacrylate-type adhesives to inhibit the anionic polymerization of the monomer due to the presence of water, etc. in the container during storage. The addition of the inhibitor serves to inhibit the anionic polymerization of the monomer during storage, but retards the setting time of the adhesive. An attempt has therefore been made to decrease the amount of the anionic polymerization inhibitor and thereby to increase the setting time. This approach, however, is limited in application because a reduction in the storate stability of the adhesive occurs as well.

SUMMARY OF THE INVENTION

Extensive investigations have been made on a method for accelerating the setting time of α-cyanoacrylate-type adhesives which is simple and which does not result in adverse effects. These investigations have led to the discovery that by incorporating a macrocyclic polyether or analogue thereof in an α-cyanoacrylate-type adhesive, the setting time of the α-cyanoacrylate-type adhesive becomes remarkably fast with little change in the storage stability from that of conventional α-cyanoacrylate-type adhesives occurring.

According to the present invention, there is provided an adhesive composition comprising an α-cyanoacrylate and about 0.1 ppm or more of at least one macrocyclic polyether compound or an analogue thereof.

DETAILED DESCRIPTION OF THE INVENTION

The α-cyanoacrylate-type adhesive of this invention is an adhesive containing as a main component an α-cyanoacrylate of the formula (I)

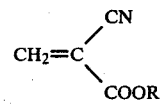

wherein R represents a straight chain or branched chain alkyl group having 1 to 12 carbon atom (which may be substituted with a substituent such as a halogen atom or an alkoxy group) a straight chain or branched chain alkenyl group having 2 to 12 carbon atoms, a straight chain or branched chain alkynyl group having 2 to 12 carbon atoms, a cycloalkyl group, an aralkyl group or an aryl group. Specific examples of the groups for R are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group.

The α-cyanoacrylate monomer present can be a single α-cyanoacrylate monomer or a mixture of two or more α-cyanoacrylate monomers can be employed. Generally, the α-cyanoacrylate monomer alone has insufficient properties as an adhesive, and other components such as the following may be added.

(1) An anionic polymerizaton inhibitor.
(2) A radical polymerization inhibitor.
(3) A thickener.
(4) Special additives such as plasticizers or heat stabilizers.
(5) Perfumes, dyes, pigments, etc.

A suitable amount of the α-cyanoacrylate monomer present in the adhesive composition is about 80 to 99.9% by weight preferably 90 to 99.9% by weight, based on the total weight of the adhesive composition.

As stated hereinabove, an anionic polymerization inhibitor is added to the α-cyanoacrylate-type adhesive e.g., in an amount of about 1 to 1000 ppm based on the total weight of the adhesive composition, to increase the stability of the adhesive during storage, and examples of known inhibitors are sulfur dioxide, aromatic sulfonic acids, aliphatic sulfonic acids, sultones, and carbon dioxide.

Suitable examples of radical polymerization inhibitors include, for example, hydroquinone and hydroquinone monomethyl ether. A radical polymerization inhibitor is added e.g., in amount of about 1 to 5000 ppm based on the total weight of the adhesive composition, for the purpose of capturing radicals which are formed by light during storage.

A thickener is added to increase the viscosity of the α-cyanoacrylate-type adhesive. The α-cyanoacrylate monomer generally has a low viscosity of about several centipoises, and therefore, the adhesive penetrates into porous materials such as wood and leather or adherends having a rough surface Thus, good adhesion strengths are difficult to obtain. Various polymers can be used as thickeners, and examples include poly(methyl methacrylate), a methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition.

The plasticizers, perfumes, dyes, pigments, etc. may be added depending on use purposes in amounts which do not adversely affect the stability of the α-cyanoacrylate monomer. A suitable amount of the plasticizer is about 0.1 to 50% by weight, of the heat stabilizer is about 0.01 to about 5% by weight and of each of the perfume, the dyes and the pigments is about 0.01 to 5% by weight, based on the total weight of the adhesive composition.

The crown compound used in this invention is a generic term for macrocyclic polyether compounds. Since the formation of these compounds was confirmed in 1967 by C. J. Pedersen of E. I. du Pont de Nemours & Co., U.S.A., many compounds falling within this category have been discovered. The name "crown ethers" comes from their structural form. The most typical cyclic hexamer of ethylene oxide is called 18-crown-6. The numeral 18 denotes the number of atoms in the ring, and the numeral 6 denotes the number of oxygen atoms in the ring.

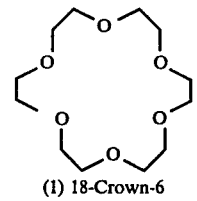

(1) 18-Crown-6

The oxygen atoms of the crown ether are aligned toward the interior of the ring, and by holding a metallic ion or an organic ion at the center of or at the upper or lower position of the ring by a coordination bond, crown ethers have a unique property of solubilizing inorganic salts (such as silver nitrate, silver chloride, etc.), alkali metal salts (such as potassium cyanide, potassium fluoride, etc.), and ammonium salts (such as ammonium thiocyanate, ammonium chloride, etc.) in aprotic or weakly polar solvents such as organic solvents (e.g., nitromethane, dimethyl sulfoxide, dimethylformamide, benzonitrile, etc.).

Typical crown ether compounds and their structures are shown in James J. Cristensen, Delbert J. Eatough and Reed M. Izatt, *Chemical Reviews*, 1974, Vol. 74, No. 3, pages 351–384. All of these compounds can be used in this invention. Good results can be obtained also with other crown compounds having a macrocyclic polyether structure and capable of selectively complexing with a metallic ion or an organic ion.

Crown ethers having nitrogen, sulfur, phosphorus, boron, etc. wholly or partly replacing the oxygen atoms, such as dithia-15-crown-5

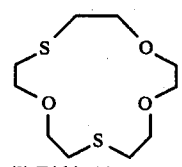

(2) Dithia-15-crown-5 can also be used in the present invention. In such case the second numeral designates the total number of oxygen atoms and analogue atoms present. Analogues of the crown ethers whose ethylene group has been partly replaced by benzo, cyclohexyl, decalyl, naphtho, methylbenzo, butylbenzo, vinylbenzo, butylcyclohexyl, oxocyclohexane, methylene, trimethylene, tetramethylene, or pentamethylene groups, and in which some of the hydrogen atoms of the ethylene group are replaced by methyl, ethyl, propyl, butyl, acetyl, phenyl, etc., groups, oxygen or fluoro atoms, etc. can also be used in this invention.

Typical examples of crown compounds that can be used in this invention are listed below.

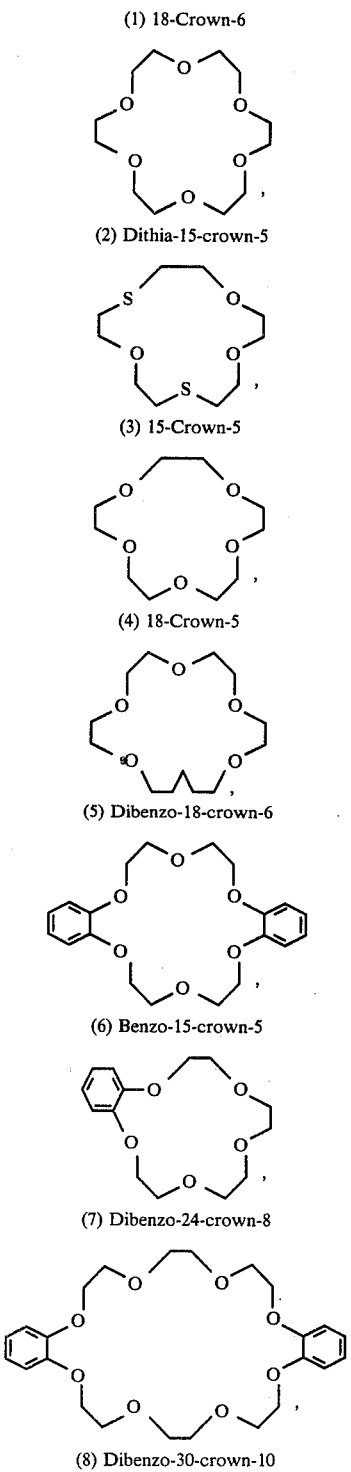

(1) 18-Crown-6

(2) Dithia-15-crown-5

(3) 15-Crown-5

(4) 18-Crown-5

(5) Dibenzo-18-crown-6

(6) Benzo-15-crown-5

(7) Dibenzo-24-crown-8

(8) Dibenzo-30-crown-10

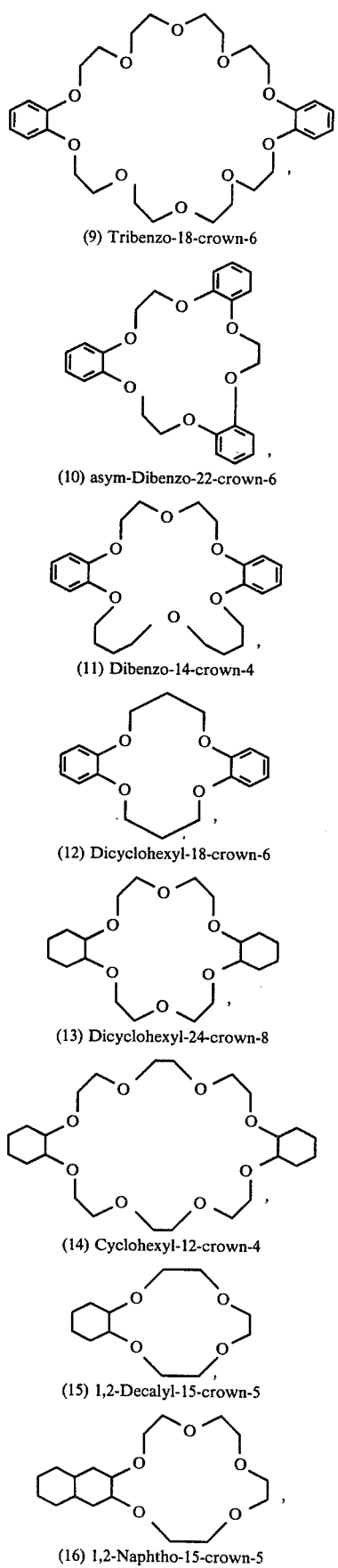

(9) Tribenzo-18-crown-6

(10) asym-Dibenzo-22-crown-6

(11) Dibenzo-14-crown-4

(12) Dicyclohexyl-18-crown-6

(13) Dicyclohexyl-24-crown-8

(14) Cyclohexyl-12-crown-4

(15) 1,2-Decalyl-15-crown-5

(16) 1,2-Naphtho-15-crown-5

-continued
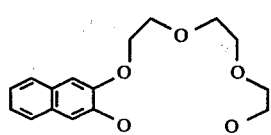
(17) 3,4,5-Naphthyl-16-crown-5
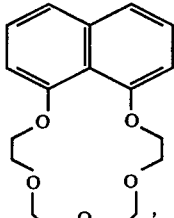
(18) 1,2-Methylbenzo-18-crown-6
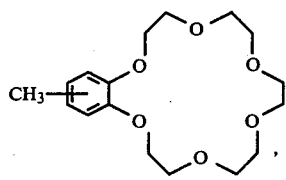
(19) 1,2-Methylbenzo-5,6-methylbenzo-18-crown-6
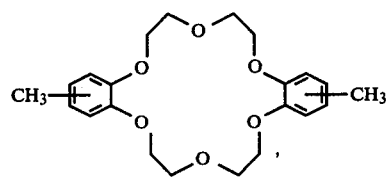
(20) 1,2-tert-Butylbenzo-18-crown-6
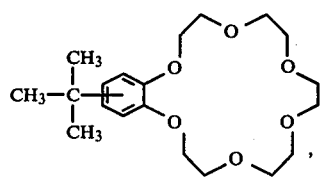
(21) 1,2-Vinylbenzo-15-crown-5
or polymer thereof
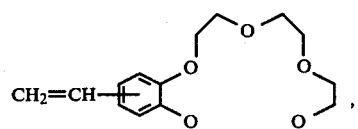
(22) 1,2-Vinylbenzo-18-crown-6
or polymer thereof
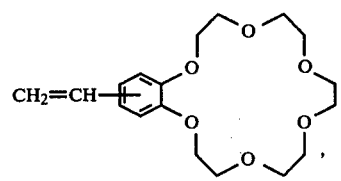
(23) 1,2-tert-Butylcyclohexyl-18-crown-6
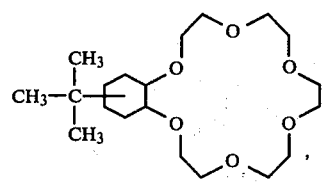
(24) 14-Crown-5
-continued
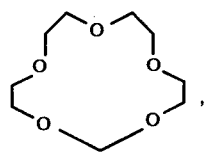
(25) 1,2-Benzo-3,4-benzo-5-oxygen-20-crown-7
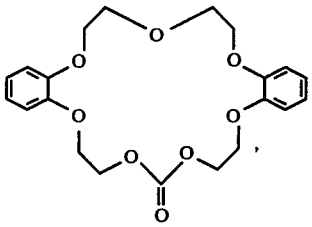
(26) 2-Methyl-4-methyl-6-methyl-8-methyl-12-crown-4
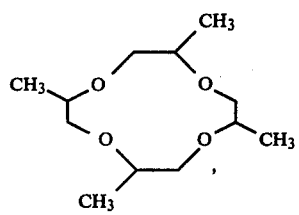
(27)
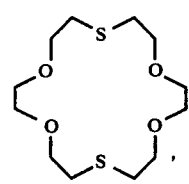
(28)
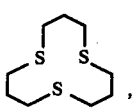
(29)
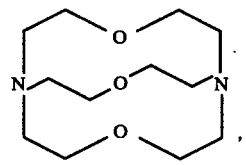
(30)
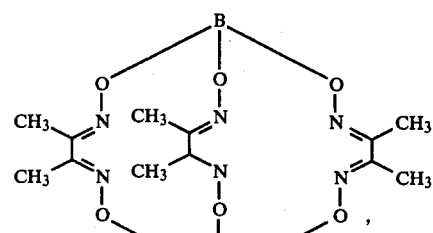
(31)

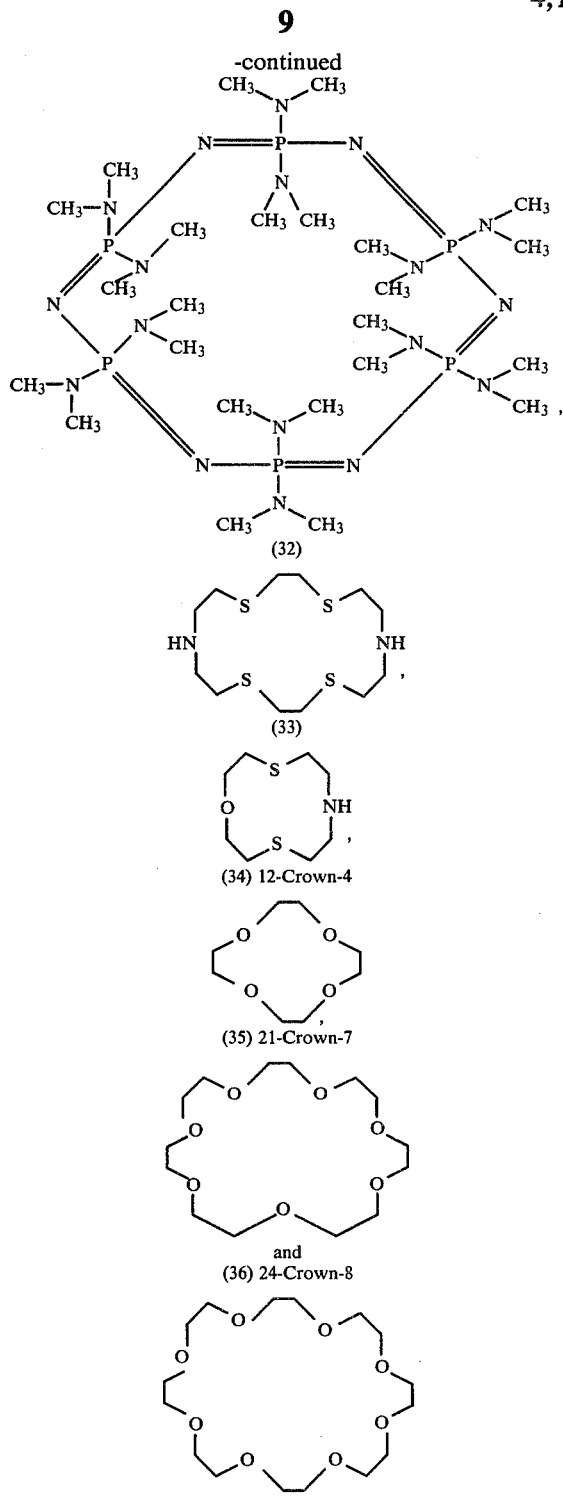

(32)

(33)

(34) 12-Crown-4

(35) 21-Crown-7 and
(36) 24-Crown-8

[The nomenclature of these compounds is based on J.J. Christensen et al, *Chem. Review*, 74 351 (1974)]. Of these compounds (1) to (36), compounds (1), (3), (5), (7), (12), (13), (34), (35) and (36) are particularly preferred in the present invention.

Crown compounds can be produced using methods described in, for example, C. J. Pederson *J. Am. Chem. Soc.*, 89, 7107 (1967), J. J. Christensen et al, *Chem. Review*, 74 351 (1974), G. W. Gokel et al, *J. Org. Chem*, 39, 2445 (1974) and C. J. Pederson *J. Org. Chem*, 36, 254 (1971). Generally, crown compounds can be synthesized by condensing a compound having a structure of the formula HO—R'—OH, such as ethylene glycol, with a compound having the structure X—R"—X in which X is Cl or a p-toluene sulfonate group in the presence of about 2 to 3 mol of a base (such as sodium hydroxide, potassium hydroxide, etc.) per mole of the compound of the formula HO—R'—OH.

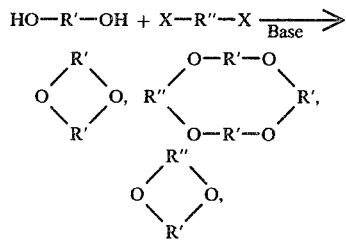

wherein R' and R" represent $-(CH_2)_{\overline{n}}$, $-(CH_2CH_2O)_{\overline{m}}$ $CH_2CH_2-$, $-CH_2CH_2-S-CH_2CH_2-$,

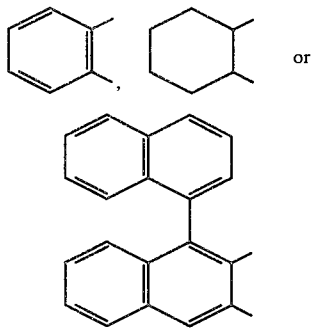

and n is an integer of 1 to 4 and m is an integer of 1 to 10.

No definite theory has yet been established as to why a crown ether compound in an α-cyanoacrylate-type adhesive composition accelerates the setting time of an α-cyanoacrylate-type adhesive without adversely affecting the storage stability of the adhesive. It is assumed, however, that a crown compound in a α-cyanoacrylate-type adhesive reacts with an adherend surface such as a metal, metal oxide or water to take cations on the surface of the adherend into the ring structure of the crown compound whereby anions on the bonding surface become excessive and abrupt anionic polymerization takes place; or that cations in the α-cyanoacrylate-type adhesive are taken into the ring structure of the crown compound or cations are taken into the α-cyanoacrylate-type adhesive by the crown compound, whereby bare anions are formed, and at the time of bonding, the bare anions are further activated by the moisture on the surface of the adherend and polymerization and curing take place abruptly.

The amount of the crown compound present in the α-cyanoacrylate-type adhesive is not particularly restricted as long as the storage stability of the adhesive composition is not adversely affected and as long as acceleration of the setting time of the adhesive composition is achieved. Generally, a suitable amount ranges from about 0.1 ppm to about 10% by weight, preferably from about 10 ppm to about 5% by weight, based on the total weight of the α-cyanoacrylate adhesive composition. Although such will vary to some extent, when the amount of the crown compound is less than about 0.1 ppm, the effect of accelerating the setting time of the adhesive is small. On the other hand, if the amount of the crown compound exceeds about 10% by weight, the α-cyanoacrylate-type adhesive frequently gels during storage, and the storage stability of the α-cyanoacrylate-type adhesive composition is reduced. An extremely fast setting time and good storage stability are well balanced when the amount of the crown compound ranges from about 0.1 ppm to about 10% by weight.

Suitable adherends which can be bonded using the α-cyanoacrylate adhesive composition of this invention include not only wooden materials and chromate-treated metallic materials described hereinabove, but also ordinary metallic materials, porous materials such as ceramics, plastics, rubbers, papers, etc. The α-cyanoacrylate adhesive composition of this invention can be easily used at normal temperatures and humidities e.g., about 0° to 35° C. and at about 30 to 100% R.H.

The following Examples and Comparative Examples are given to illustrate the present invention in greater detail.

All parts, percentages, ratios and the like in the examples are by weight, unless otherwise indicated. The various properties given in these examples were measured using the following methods.

(1) Setting Time

The setting time was measured in accordance with the method for testing setting time in "Testing Method for α-Cyanoacrylate-Type Adhesives" in *Standards of Japanese Adhesive Industry Association,* JAI-4. The test piece used had a size of 5 mm×20 mm (adhering surface)×35 mm. Where the test piece was wood, the size was 12.7 mm×12.7 mm×38 mm, and the setting time of the adhesive at the grain surface in the horizontal direction of the wood was measured. The moisture content of the wood was measured using a Kett wood moisture meter.

(2) Compression Shear Strength

Compression shear strength was measured in accordance with JIS K-6852 relating to "Testing Method for Compression Shear Strength of Adhesives". The test piece had a size of 12.7 mm×12.7 mm×38 mm. Wooden test pieces are bonded to each other at the grain surfaces with a bonded area of 1.61 cm$^2$. The rate of compression was 20 mm/min.

(3) Tensile Strength

Tensile strength was measured in accordance with the testing method for tensile strength in JAI-4 as in the case of measurement of setting time in (1) above. The test piece had a size of 5 mm×10 mm (bonded surface)×35 mm, and the rate of pulling was 20 mm/min.

(4) Storage Stability

Storage stability was measured in accordance with the testing method for storage stability in JAI-4. The test piece was allowed to stand for 5 days at a constant temperature zone of 70°±2° C., and then the change in viscosity and setting time of the adhesive were evaluated in comparison with a control.

EXAMPLE 1 AND COMPARATIVE EXAMPLE 1

In an α-cyanoacrylate-type adhesive comprising 100 g of ethyl α-cyanoacrylate monomer, 50 ppm of sulfur dioxide as an anionic polymerization inhibitor and 200 ppm of hydroquinone as a radical polymerization inhibitor was dissolved 500 ppm of dicyclohexyl-18-crown-6 (CROWN ETHER C-18, a trademark for a product of Nippon Soda Co., Ltd.). The resulting adhesive composition was applied to an adherend of lauan timber (with a moisture content of 9.8%) in an atmosphere at 23° C. and an RH of 55%, and the setting time was measured. The adhesive composition set completely in 30 seconds. After aging for 24 hours, the compression shear strength was 120 kg/cm$^2$, and the woody tissue of the lauan timber sample broke.

As Comparative Example 1, the setting time of the same α-cyanoacrylate-type adhesive but without the addition of dicyclohexyl-18-crown-6 was tested. When the adhesive was applied to the test sample and allowed to stand for more than 10 minutes, no bonding force due to the adhesive was generated.

When the adhesive compositions of Example 1 and Comparative Example 1 were tested for storage stability at 70°±2° C., no change was observed in viscosity and setting time for more than 5 days.

EXAMPLES 2 TO 7 AND COMPARATIVE EXAMPLES 2 TO 4

In an α-cyanoacrylate-type adhesive consisting of 100 g of ethyl α-cyanoacrylate monomer, 50 ppm of sulfur dioxide and 200 ppm of hydroquinone was dissolved 500 ppm of each of the crown compounds shown in Table 1 below. The setting time of each of the adhesive compositions was measured in an atmosphere at 20° C. and RH of 35% using balsa wood (with a moisture content of 6.5%) as an adherend. The results are also shown in Table 1 below.

Table 1

| Example (Ex.) and Comparative Example (CEx.) | Crown Compound | Setting Time on Balsa Wood (seconds) |
|---|---|---|
| Ex. 2 | 15-Crown-5 | 2 |
| Ex. 3 | 18-Crown-6 | 2 |
| Ex. 4 | Dibenzo-18-crown-6 | 5 |
| Ex. 5 | Dicyclohexyl-18-crown-6 | 2 |
| Ex. 6 | Dibenzo-24-crown-8 | 5 |
| Ex. 7 | Dicyclohexyl-24-crown-8 | 2 |
| CEx. 2 | None | 40 |
| CEx. 3 | Diethylene Glycol | 40 |
| CEx. 4 | Diethylene Glycol Monoethyl Ether | 40 |

The results shown in Table 1 above demonstrate that the addition of the crown compounds markedly accelerates the setting time, but diethylene glycol and diethylene glycol monoethyl ether which are not crown compounds hardly produced any accelerating effect.

EXAMPLES 8 TO 11 AND COMPARATIVE EXAMPLE 5

In an α-cyanoacrylate-type adhesive having a viscosity at 20° C. of 200 centipoises obtained by adding 10 ppm of p-toluenesulfonic acid, 100 ppm of hydroquinone and 4% of poly(methyl methacrylate) to 100 g of ethyl α-cyanoacrylate monomer was dissolved 15-crown-5 (CROWN ETHER 0-5, a trademark for a product of Nippon Soda Co., Ltd.) in the amounts indicated in Table 2 below.

The setting time and tensile strength of the adhesive compositions were measured in an atmosphere at 23° C. and RH 55% using a rigid polyvinyl chloride board (PVC), balsa wood (with a water content of 7.5%) and Japanese cypress (with a water content of 7.8%) as adherends. Furthermore, the storage stability of the adhesive compositions was tested at 70°±2° C. The results obtained are shwon in Table 2 below.

Table 2

| Example (Ex.) and Comparative Example (CEx.) | Amount of 15-Crown-5 (ppm) | Setting Time (Seconds) Balsa Wood | Setting Time (Seconds) Japanese Cypress | Setting Time (Seconds) PVC | Tensile Strength PVC/PVC (kg/cm²) | Storage Stability (70° C.) |
|---|---|---|---|---|---|---|
| CEx. 5 | None | 30 | More than 300 | 5 | 380 | More than 5 days |
| Ex. 8 | 10 | 15 | 120 | 5 | 385 | More than 5 days |
| Ex. 9 | 100 | 5 | 60 | 4 | 375 | More than 5 days |
| Ex. 10 | 500 | 2 | 15 | 3 | 370 | More than 5 days |
| Ex. 11 | 1000 | 2 | 15 | 2 | 380 | More than 5 days |

The results shown in Table 2 above demonstrate that the addition of the crown ether compound accelerated the setting time on any of the adherend materials tested.

EXAMPLES 12 TO 18 AND COMPARATIVE EXAMPLES 6 TO 12

200 ppm of 18-crown-6 (CROWN ETHER 0-18, a trademark for a product of Nippon Soda Co., Ltd.) was dissolved in various adhesive compositions based on α-cyanoacrylates with different alkyl groups and an adhesive composition based on allyl α-cyanoacrylate (all containing 50 ppm of sulfur dioxide and 200 ppm of hydroquinone). The setting time of each adhesive composition was measured using a test piece of balsa wood (with a moisture content of 7.5%) and a test piece of steel as an adherend in an atmosphere at 23° C. and RH 55%. For comparison, the setting times of adhesive compositions of the α-cyanoacrylate type which did not contain the crown ethers were tested under the same conditions. The results obtained are shown in Table 3 below.

Table 3

| Example (Ex.) and Comparative Example (CEx.) | Alkyl or Allyl Group of α-Cyanoacrylate (R group) | Thickener | Setting Time (seconds) Balsa Wood | Setting Time (seconds) Steel |
|---|---|---|---|---|
| Ex. 12 | Methyl | None | 2 | 15 |
| Ex. 13 | Ethyl | None | 2 | 10 |
| Ex. 14 | Isobutyl | None | 3 | 15 |
| Ex. 15 | Allyl | None | 2 | 10 |
| Ex. 16 | Methyl | Poly(methyl methacrylate), 3% | 3 | 15 |
| Ex. 17 | Ethyl | Poly(methyl methacrylate), 3% | 3 | 15 |
| Ex. 18 | Ethyl | Poly(methyl methacrylate), 6% | 3 | 15 |
| CEx. 6 | Methyl | None | 30 | 50 |
| CEx. 7 | Ethyl | None | 20 | 40 |
| CEx. 8 | Isobutyl | None | 30 | 60 |
| CEx. 9 | Allyl | None | 30 | 40 |
| CEx. 10 | Methyl | Poly(methyl methacrylate), 3% | 30 | 50 |
| CEx. 11 | Ethyl | Poly(methyl methacrylate), 3% | 20 | 50 |
| CEx. 12 | Ethyl | Poly(methyl methacrylate), 6% | 30 | 60 |

The results demonstrate that the addition of the crown ether accelerated the setting time of α-cyanoacrylate-type adhesives regardless of the kind of alkyl group or allyl group substituent on the α-cyanoacrylate.

EXAMPLE 19 AND COMPARATIVE EXAMPLE 13

1,000 ppm of 15-crown-5 was dissolved in an α-cyanoacrylate-type adhesive comprising 100 g of methyl α-cyanoacrylate, 50 ppm of sulfur dioxide, 400 ppm of hydroquinone and 3% of poly(methyl methacrylate), and the setting time of the resulting adhesive composition on various materials was measured. For comparison, the setting time of an adhesive composition of the above formulation without the crown ether was measured. The measurement was performed in an atmosphere at 23° C. and RH 55%. The results obtained are shown in Table 4 below.

Table 4

| Adherend | Setting Time (seconds) in Example 19 | Setting Time (seconds) in Comparative Example 13 |
|---|---|---|
| Balsa | 2 | 30 |
| Lauan | 15 | More than 300 |
| Lauan Veneer | 15 | More than 300 |
| Japanese Cedar | 5 | More than 300 |
| Spruce | 20 | More than 300 |
| Birch | 15 | 120 |
| Rosewood | 2 | 10 |
| Ceramics | 60 | More than 300 |
| Rigid PVC | 3 | 5 |

Table 4-continued

| Adherend | Setting Time (seconds) in Example 19 | Setting Time (seconds) in Comparative Example 13 |
|---|---|---|
| Natural Rubber | Less than 3 | 3 |
| Steel | 7 | 45 |
| Aluminum | 10 | 90 |
| Cardboard | 5 | More than 300 |

These results in Table 4 demonstrate the addition of the crown ether accelerates the setting time of the adhesive composition on many materials such as wood, ceramics, plastics, rubber and metal.

While the invention has been described in detail and with reference to specific embodiments thereof, it will be apparent to one skilled in the art that various changes and modifications can be made therein without departing from the spirit and scope thereof.

What is claimed is:

1. An adhesive composition comprising a minimum of 80% by weight of an alpha-cyanoacrylate represented by the general formula (I)

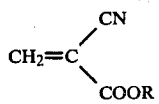

wherein R represents a straight chain or branched chain alkyl group which may be substituted with a halogen atom or an alkoxy group, a straight chain or branched chain alkenyl group, a straight chain or branched chain alkynyl group, a cycloalkyl group, an aralkyl group or an aryl group, and about 0.1 ppm or more, based on the total weight of said adhesive composition, of at least one crown compound selected from the group consisting of macrocyclic polyethers and macrocyclic polyethers wherein nitrogen, sulphur, phosphorus or boron wholly or partially replace oxygen atoms of the macrocyclic polyether.

2. The composition of claim 1, wherein the amount of the crown compound is about 0.1 ppm to about 10% by weight based on the total weight of said adhesive composition.

3. The composition of claim 1, wherein the amount of the crown compound is 10 ppm to 5% by weight based on the amount of said adhesive composition.

4. The composition of claim 1, wherein R is a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a 2-chloroethyl group, a 3-chloropropyl group, a 2-chlorobutyl group, a trifluoroethyl group, a 2-methoxyethyl group, a 3-methoxybutyl group or a 2-ethoxyethyl group.

5. The composition of claim 1, wherein said macrocyclic polyether compound is

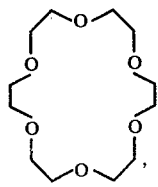

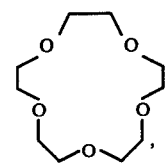

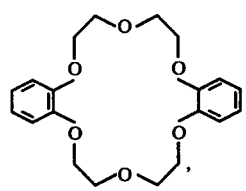

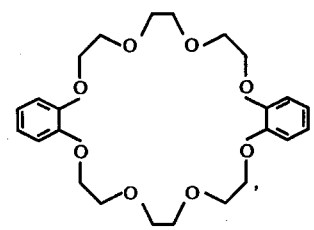

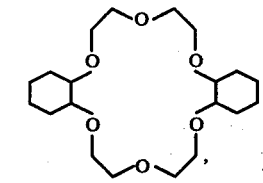

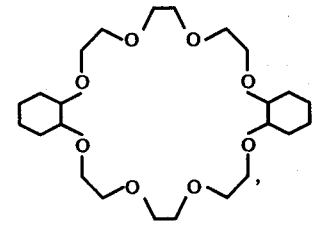

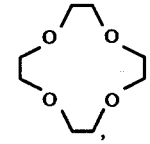

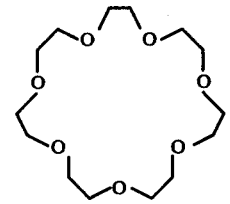

or

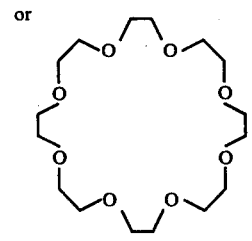

6. The composition of claim 1, wherein said crown compound are represented by

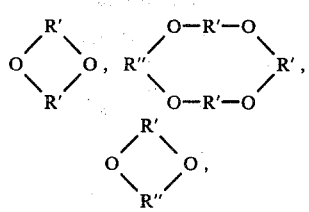

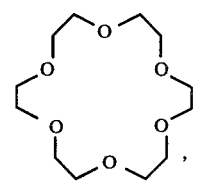

(1) 18-Crown-6 wherein R' and R" represent $-(-CH_2)_{\overline{n}}$, $-(-CH_2CH_2O)_{\overline{m}}$ $CH_2CH_2-$, $-CH_2CH_2-S-CH_2CH_2-$,

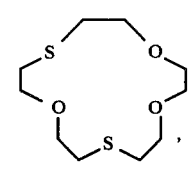

(2) Dithia-15-crown-5

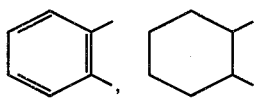 or

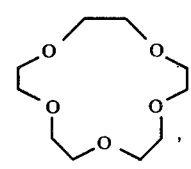

(3) 15-Crown-5

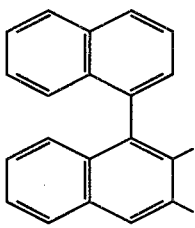

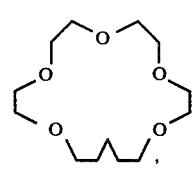

(4) 18-Crown-5 and n is an integer of 1 to 4 and m is an integer of 1 to 10.

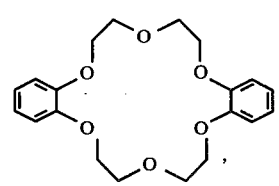

(5) Dibenzo-18-crown-6

7. The composition of claim 1, wherein said crown compounds are synthesized by condensing a compound having a structure of the formula HO—R'—OH, with a compound having the structure X—R"—X in which X is Cl or a p-toluene sulfonate group in the presence of about 2 to 3 mol of a base per mol of the compound of the formula HO—R'—OH, wherein R' and R" represent $-(CH_2)_{\overline{n}}$, $-(CH_2CH_2O)_{\overline{m}}$ $CH_2CH_2-$, $-CH_2C-H_2-S-CH_2CH_2-$,

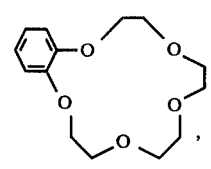

(6) Benzo-15-crown-5

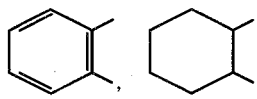 or

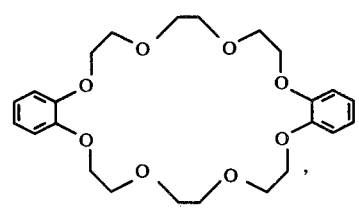

(7) Dibenzo-24-crown-8

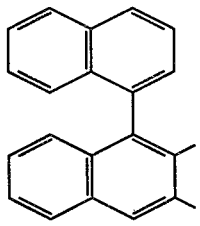

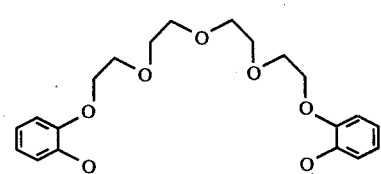

(8) Dibenzo-30-crown-10 and n is an integer of 1 to 4 and m is an integer of 1 to 10.

8. The composition of claim 7, wherein ethylene groups of said crown compounds are partly replaced by benzo, cyclohexyl, decalyl, naphtho, methylbenzo, butylbenzo, vinylbenzo, butylcyclohexyl, oxocyclohexane, methylene, trimethylene, tetramethylene, or pentamethylene groups, and in which some of the hydrogen atoms of the ethylene group are replaced by methyl, ethyl, propyl, butyl, acetyl or phenyl.

9. The composition of claim 1, wherein said crown compound is a compound selected from the group consisting of

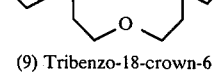

(9) Tribenzo-18-crown-6

-continued

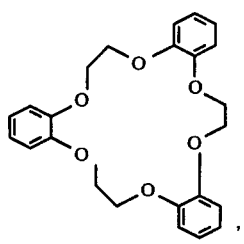

(10) asym-Dibenzo-22-crown-6

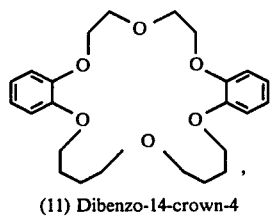

(11) Dibenzo-14-crown-4

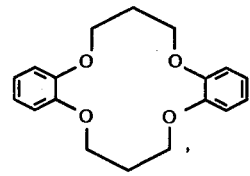

(12) Dicyclohexyl-18-crown-6

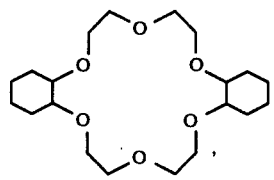

(13) Dicyclohexyl-24-crown-8

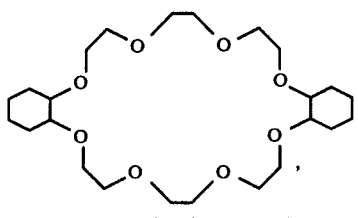

(14) Cyclohexyl-12-crown-4

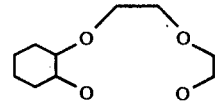

(15) 1,2-Decalyl-15-crown-5

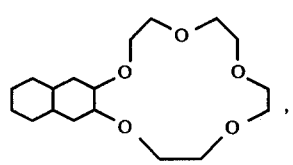

(16) 1,2-Naphtho-15-crown-5

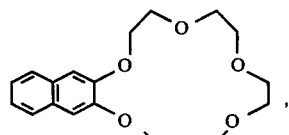

(17) 3,4,5-Naphthyl-16-crown-5

-continued

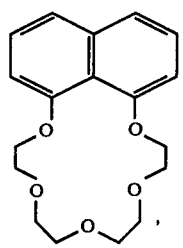

(18) 1,2-Methylbenzo-18-crown-6

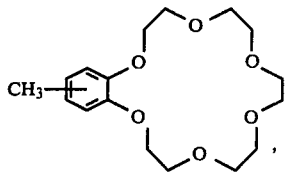

(19) 1,2-Methylbenzo-5,6-methylbenzo-18-crown-6

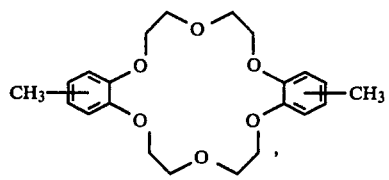

(20) 1,2-tert-Butylbenzo-18-crown-6

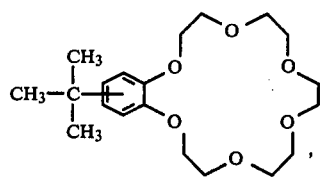

(21) 1,2-Vinylbenzo-15-crown-5

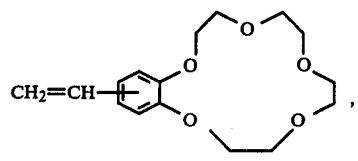

or polymer thereof
(22) 1,2-Vinylbenzo-18-crown-6

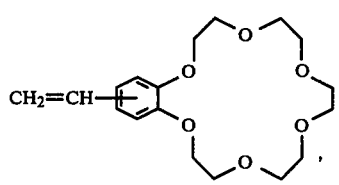

or polymer thereof
(23) 1,2-tert-Butylcyclohexyl-18-crown-6

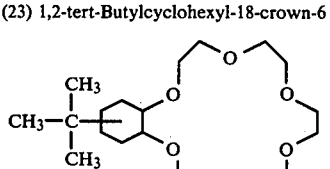

(24) 14-Crown-5

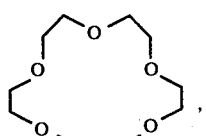

(25) 1,2-Benzo-3,4-benzo-5-oxygen-20-crown-7

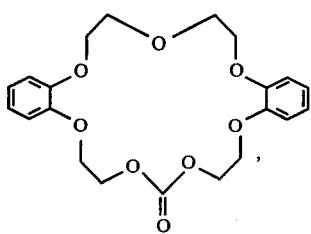

(26) 2-Methyl-4-methyl-6-methyl-8-methyl-12-crown-4

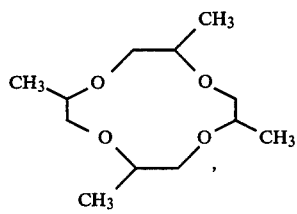

(27)

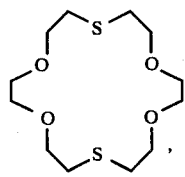

(28)

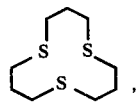

(29)

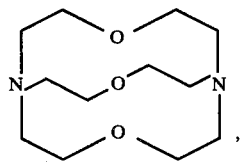

(30)

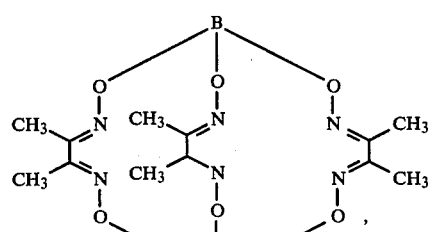

(31)

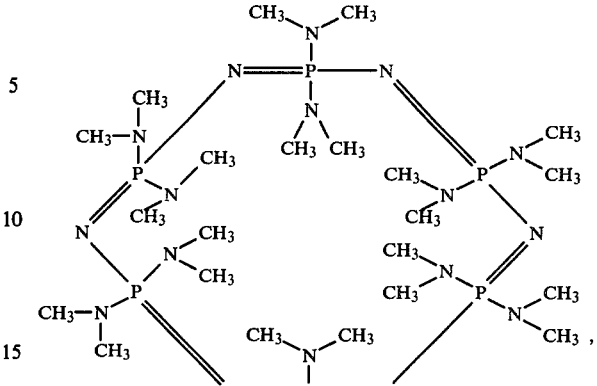

(32)

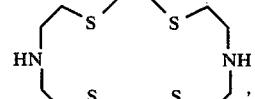

(33)

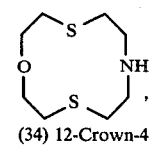

(34) 12-Crown-4

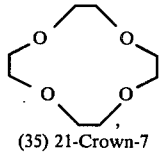

(35) 21-Crown-7

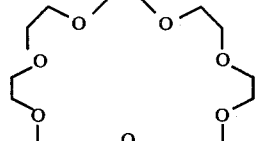

and
(36) 24-Crown-8

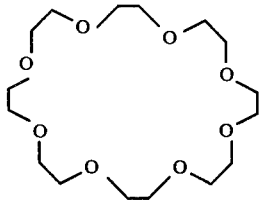

10. The composition of claim 1, wherein said composition additionally contains an anionic polymerization inhibitor and a radical polymerization inhibitor.

11. The composition of claim 10, wherein said composition further contains at least one of a thickener, a plasticizer, a heat stabilizer, a perfume, or a colorant.

* * * * *